Patented May 6, 1924.

1,492,964

UNITED STATES PATENT OFFICE.

FRANK E. COOMBS, OF SAN FRANCISCO, CALIFORNIA.

PRESERVING FRUIT JUICES.

No Drawing.   Application filed October 17, 1921. Serial No. 508,220.

*To all whom it may concern:*

Be it known that I, FRANK E. COOMBS, a citizen of the United States, residing at San Francisco, in the county of San Francisco and State of California, have invented certain new and useful Improvements in Preserving Fruit Juices, of which the following is a specification.

This invention relates to preserving fruit juices; and it comprises a method wherein fruit juices are preserved temporarily with the aid of sulfurous acid and are subsequently treated with hydrogen peroxid in the amount necessary to oxidize the $SO_2$ present; all as more fully hereinafter set forth and as claimed.

It is well known that fruit juices, such as grape must and the like, can be preserved for indefinite periods at slight cost if they are treated, before fermentation has set in appreciably, with sulfurous acid, either as a gas or in solution, and this art is of long standing, especially in the manufacture of wine. Juices so preserved may be stored indefinitely if kept out of strong light and at temperatures at or below 15.5° C. and in practice are so held over for as long as fourteen months or more. Storage by refrigeration not only requires lower temperatures, more attendance and much greater expense but fails in the case of delicately scented or attractively colored products for the reason that the oxygen of the air slowly and inevitably alters the unstable organic coloring matters and agreeable esters.

Free sulfurous acid, however, acts in two desirable ways, it permits storage at comparatively high or atmospheric temperatures, attainable without resort to refrigerating machines, and at the same time it functions as a "cover" for the valuable but unstable organic coloring and flavoring bases, since the atmospheric oxygen does not attack these until the more easily oxidized free $SO_2$ has been wholly used up.

In preserving the juices by sulfurous acid, a minimum of $SO_2$ is, of course, used, the amount depending largely upon the temperature that can be maintained naturally at the place of storage. Where the weather is hot, as much as 0.2 per cent (2 grams per litre) may be used, and in more favorable circumstances as little as 0.08 per cent. Aside from the peculiar sharpness and pungent taste given to the fruit juice that contains sulfurous acid, there is another effect noticed. Strongly colored juices, such as that of red wine grapes, blackberry and the like, show actual combination of the coloring bodies with the preservative, and the color fades to a very pale tint. This fading, however, is temporary only, and the original color returns at once when the sulfurous acid has been removed or destroyed, provided the means taken for removal of the sulfurous acid is carefully controlled and is not permitted to extend its action to the coloring matter or flavors.

In eliminating sulfurous acid from such juices it has hitherto been customary to heat them and then to blow air, or warmed air, through a body of the juice until the preservative is mechanically separated in part, and in part oxidized. Blowing out is not feasible with a cold fruit juice, as it requires too long a time and the great excess of air used strongly and permanently oxidizes the color and alters or completely destroys it before the sulfurous acid combined with the organic matter has been oxidized. When the liquor is hot, there is a carrying away by the air of the volatile esters and other delicate flavoring constituents. It is therefore eminently desirable to remove, or to neutralize, the sulfurous acid in such juices in the cold and as rapidly as possible; or if heat is used, and air blowing, to reduce the time during which this drastic method must be employed; and it is the purpose of the present invention to furnish a method of procedure and a suitable reagent substance, for attaining these ends.

Fruit juices, for commercial purposes and with regard to the process to be described, may be classed under two heads, of which one embraces those fruits of which the flavors are most agreeable if not cooked, or if cooked as little as possible, such as strawberry; and the other class such fruits as raspberry, which are to most palates improved by cooking as certain more agreeable aromas are developed or uncovered during this cooking. Fruits also vary as to the ease with which they will impart their characteristic colors to the juices expressed from them, cooking or heating usually facilitating this effect, since the coloring matters are as a rule seated in the skins, and this dense tissue which escapes the crushing of the friut press while raw, is much softened when heated and then parts with the color freely.

With fruits of the first class it is desirable to express the juice in the cold and then immediately to add sufficient sulfurous acid as gas or in solution, to inhibit development of yeast spores, molds and bacteria. This quantity will, as previously explained, vary with the temperature at which the juice is to be stored, and it will also vary with the soundness of the fruit treated and with the greater or less amount of fermentable sugars that may naturally exist in the fruit. But the amount will usually be below 2000 milligrams of $SO_2$ per litre. The sulfited juice is then to be barrelled or otherwise stored away from air and light contact and at as low a temperature as is convenient until it is wanted for use. With fruits of the first class in order to obtain full color it may be necessary to work sometimes as follows: after pressing, a small portion of the expressed raw juice is returned upon the marc, or pomace and mixed with it, then the mass is heated to about 71° C. until the skins are softened and the color freed, when the mixture is pressed hot, the juice cooled to not over 40° C., and added to the raw-pressed juice, sulfurous acid then being introduced as described before. With fruits of the second class, preliminary cooking is given to the raw fruit before pressing, this process being continued at a temperature and for a length of time which may be suited to the particular fruit under treatment. The expressed and cooked juice is then sulfited as with the first class and stored as described, the sulfitation being done, of course, after cooling of the juice in order to promote absorption of the gas, or better retention of the solution if the latter is used. Such sulfited juices of either class can be transported without icing if contained in tight packages and protected from long exposure to heat. They should not be given any additions of sugar before the time comes for using them.

When juices thus sulfited and stored are to be removed from the original package and prepared for retail trade, samples of the package contents are carefully drawn and measured amounts of the sample, which for convenience may be 100 cubic centimetres, or some fraction of a gallon or barrel, are taken and arranged in a series. To each of them is then added, from an accurate measuring pipette, quantities of a standard solution of hydrogen peroxid—which may be the accepted 3 per cent U. S. P. formula for convenience—and the samples shaken. Within fifteen minutes one of the samples will have shown a more complete return of the original color than the others. The second series of three or four samples is arranged and treated with the same reagent in amounts to give a close range above and below the one first found to be nearly correct, this being a usual method for determining dosage in technical work. A proper dosage will be found from this series of tests and this dosage is then given to the storage lot, taking care to use a trace less than the full amount shown in the test series, since a small excess of the peroxid may in some cases act upon and more or less injure the coloring matter after the sulfurous acid has been oxidized, and it will also in some measure affect the flavors unfavorably. But in practice I have found that the dosage can be controlled with little trouble and permanent restoration of full color and flavor secured.

Such restored juices are now susceptible to the action of ferments and should be protected from them as fresh juice would be, by heating to a pasteurizing temperature, or higher, and immediately sealing in the retailers' package for dispensing. Just before pasteurizing are made such additions of sugar or other desired ingredients as may be necessary for bringing the material to a proper commercial condition. Or the sulfited juices may be prepared by the retailer as they are wanted for dispensing, since the peroxid treatment is easy to apply to small as well as larger quantities; and once determined for the contents of a barrel, the same dosage remains correct until all is used if the original package is kept cool and closed from air contact, and protected from light.

The specific action of the peroxid solution seems to be a selective oxidation, first, of the sulfurous acid which is present in a free state; then of the organically combined acid; and last, action upon organic matters present in the juice, which last effect is to be avoided. The net result of the reaction of the peroxid upon the sulfurous acid is production of an equivalent and exceedingly small amount of $SO_3$ and of water, the $SO_3$ tending to combine with the potash and other bases present in the material as a neutral sulfate, not harmful in these minute quantities.

I have as an alternate method, used ozone diluted with air, and I find that the same result can be obtained so far as a safe restoration of color etc. is concerned, and in certain circumstances, such as cheap electric current, large quantities of product to be treated and working through a large part of the year, this ozonizing method might be preferred. But it has certain disadvantages in respect to more troublesome ascertainment of dosage, impracticability on a small scale and so on, and my preferred method would be, as described, by the use of hydrogen peroxid. I may use a solution of practically pure peroxid, or I may use a technical solution such as is produced by neutralizing sodium peroxid with dilute hydrochloric acid, letting the sodium chlorid ingredient enter the fruit juice along with the reagent, since in traces it is not objectionable and in some degree is a help to development of flavors, through its well-known function of stimulating the gustatory nerves.

Occasionally in working with fruit juices one is encountered in which vinous fermentation has taken place to such a degree as to produce a percentage of alcohol greatly in excess of the legal tolerance in beverages. In working with such material I have found it advantageous to heat the juice before sulfitation enough to destroy as much as possible of living ferments, then to cool and add sulfurous acid. This leaves alcohol in the preserved liquors, and when the final step of oxidation with $H_2O_2$ is to be performed, I first employ another step comprising frothing the liquor with atmospheric air mingled with steam, the mixed air and vapor being at temperature high enough to volatilize the alcohol and the excess air functioning to carry away the alcoholic vapors. By care in proportioning the air and the steam, this can be done in a way to avoid either dilution or evaporation and to maintain the original bulk of the fruit juice, which, freed from the objectionable alcohol is then cooled and treated as in other instances with the required dosage of peroxid. And in some cases I have also found it desirable to guard against oxidation of the color by first using a deficient dosage of the peroxid, and then contacting the juice as a film or otherwise with atmospheric air, warming the juice to aid the reaction, which is completed by the oxygen of the atmosphere so slowly that it can be easily watched and controlled. This method is particularly advantageous when alcohol is present in amounts greater than legal tolerance, as the frothing air can be warmed by mixing steam with it and the excess alcohol volatilized during the progress of the oxidation.

I find that the effect of activated oxygen, and especially of such oxygen when released from hydrogen peroxid, upon organic solutions, promotes various alterations of organic and inorganic bodies present therein, sometimes beneficial and at other times harmful, both influences operating side by side; but these actions are all of them inhibited by the presence in excess of sulfurous acid, free or combined. They do not take place until this acid has been oxidized and therefore control of the oxidation can be regulated and its action limited to its influence upon those bodies which are first oxidized after the sulfurous acid is destroyed.

In the case of red or highly colored fruit juices, the restoration of original color is a satisfactory indicator of the point to which the oxidation is to be carried, and operation of this process has already been described with such liquids. If, however, the liquid is not highly colored enough to make this point a distinct and reliable end-point, the better method will be to correlate the action of the oxygen-giving reagent that is to be used with its oxidizing power upon sulfurous acid, and then, having established the amount of total $SO_2$ in the liquid or fruit juice to be treated, calculate the correct dosage by means of preliminary tests substantially as described and use that amount which shall destroy the said acid in the bulk of the liquid to be treated, by which means there will be restoration of the original properties of the fresh liquid. The traces of $SO_3$ resulting from oxidation of the preservative acid used, are practically negligible. They may be neutralized with calcium carbonate if necessary.

What I claim is:—

1. In the temporary preservation of fruit juices the process which comprises treating such juice with $SO_2$ in amount sufficient to cause preservation, storing for the desired length of time and finally adding active oxygen in amount not greater than that necessary to convert $SO_2$ into $SO_3$.

2. In the temporary preservation of fruit juices the process which comprises treating such juice with $SO_2$ in amount sufficient to cause preservation, storing for the desired length of time and finally adding active oxygen in the form of hydrogen peroxid in amount not greater than that necessary to convert $SO_2$ into $SO_3$.

3. In the temporary preservation of fruit juices the process which comprises treating such juice with $SO_2$ in amount sufficient to cause preservation, storing for the desired length of time and finally oxidizing the $SO_2$ to $SO_3$ with the aid of air and active oxygen.

4. In the temporary preservation of fruit juices the process which comprises treating such juice with $SO_2$ in amount sufficient to cause preservation, storing for the desired length of time and finally oxidizing the $SO_2$ to $SO_3$ with the aid of air and active oxygen in the form of hydrogen peroxid.

5. In the temporary preservation of fruit juices undergoing the vinous fermentation the process which comprises adding $SO_2$ in amount sufficient to cause preservation, storing for the desired length of time, blowing with air and steam to remove alcohol and adding active oxygen in amount not greater than sufficient to convert residual $SO_2$ into $SO_3$.

In testimony whereof, I have hereunto affixed my signature.

FRANK E. COOMBS.